June 5, 1962 W. D. ALLISON 3,037,789
TORSION BAR SPRINGS
Filed Aug. 13, 1959 4 Sheets-Sheet 4
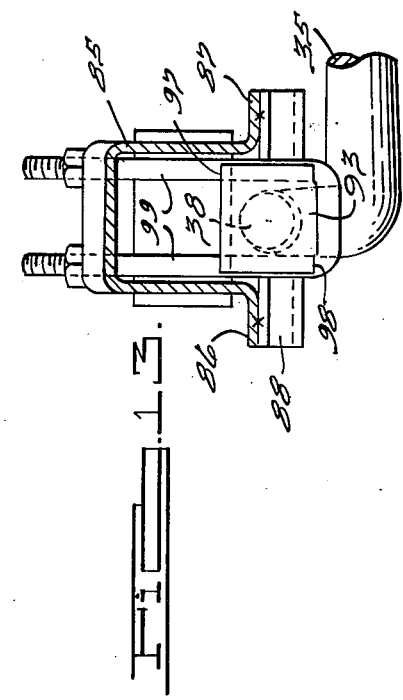
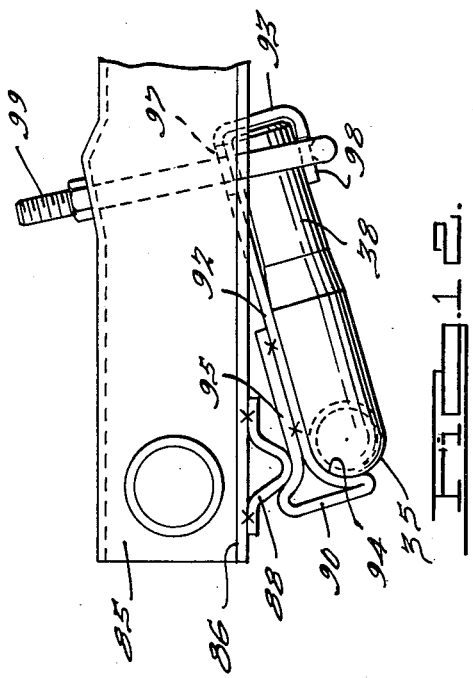
INVENTOR.
William D. Allison.
BY
Lawrence C. Witker
ATTORNEY.

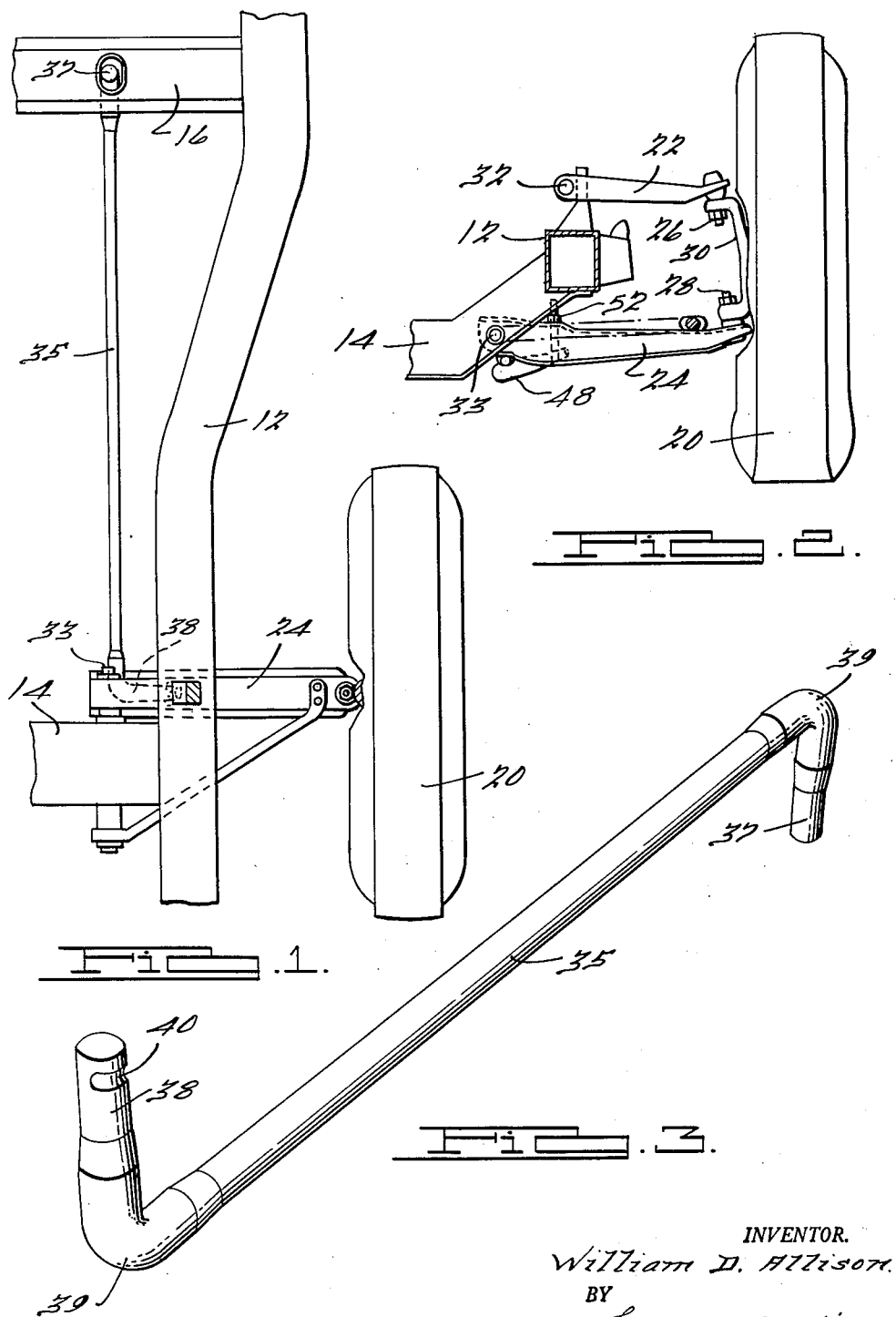

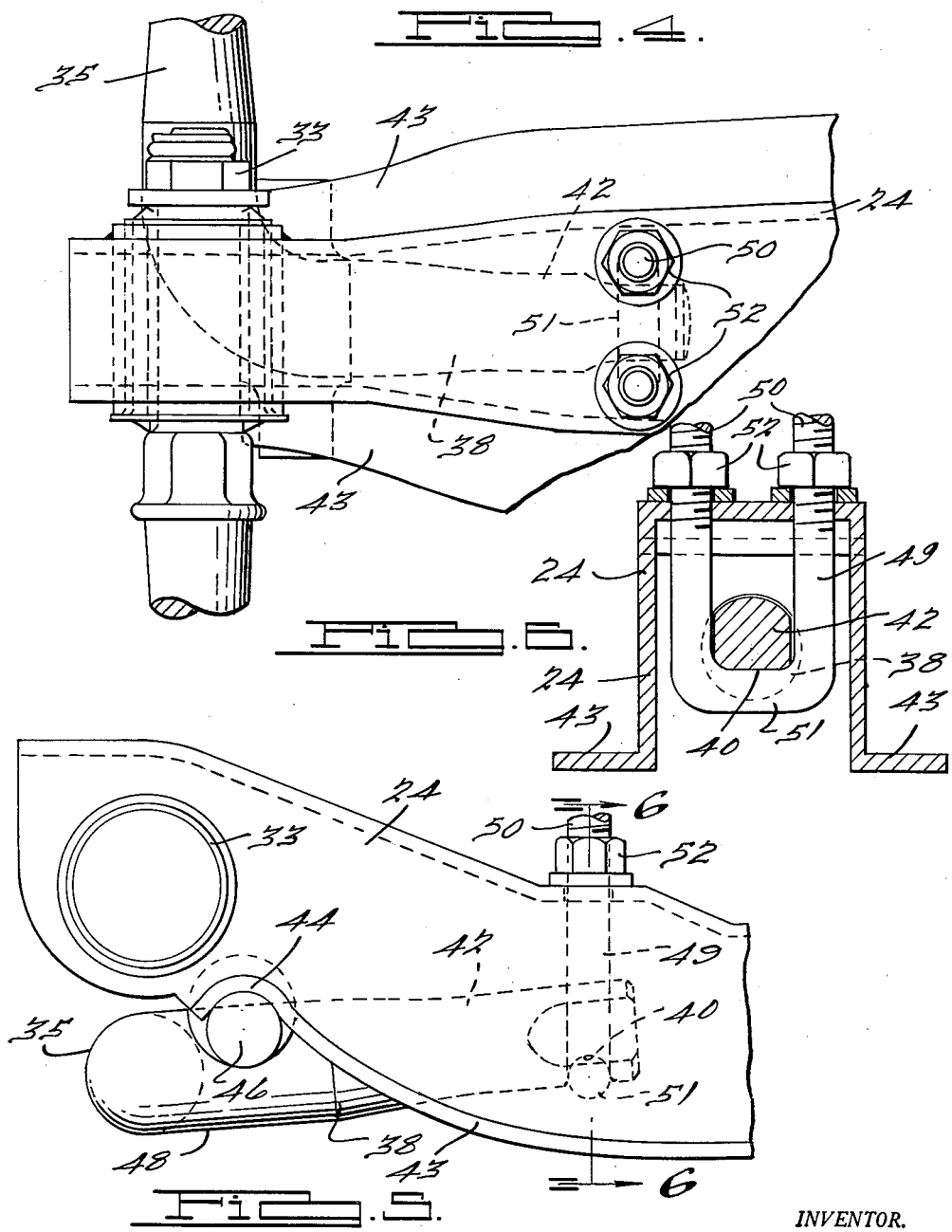

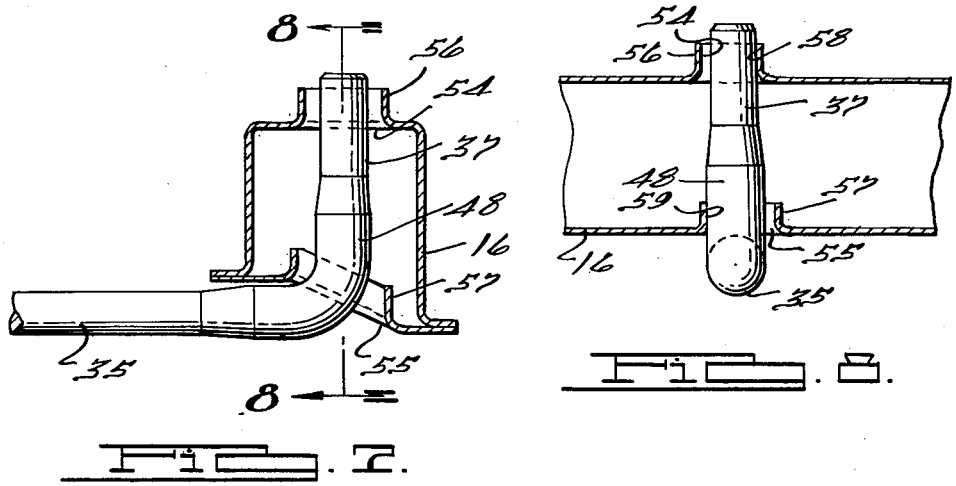
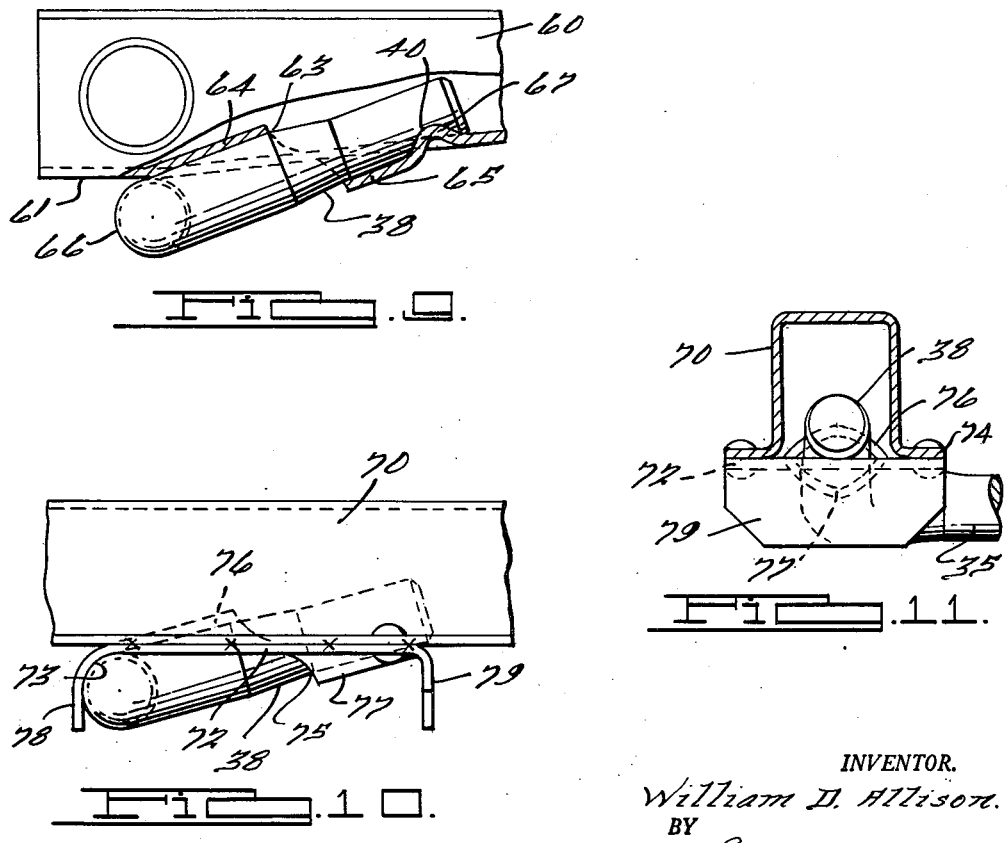

United States Patent Office 3,037,789
Patented June 5, 1962

3,037,789
TORSION BAR SPRINGS
William D. Allison, 39 Radnor Circle, Grosse Pointe Farms 36, Mich., assignor of fifty percent to Elmer Jamison Gray, Detroit, Mich.
Filed Aug. 13, 1959, Ser. No. 833,582
6 Claims. (Cl. 280—124)

This invention relates to spring suspensions for motor vehicles and is particularly directed to torsion bar spring means adapted to provide for independent wheel motion.

One of the principal objects of the invention is to provide an improved, simplified and more economical spring suspension for a vehicle wherein the torsion bars or springs of the suspension are bent at their ends to provide angularly extending lever arms or levers connected to the wheels in such a manner as to be responsive to up and down motion of the wheels effective to twist or angularly deflect the torsion bars and in which the lever arm ends are connected to the relatively movable vehicle wheels and frame in a new, novel and simplified manner.

A further object of the invention is to provide a torsion bar end construction in which the lever arms are integral with and formed by bending the ends of the bars angularly with respect thereto, the bends being of thickened cross-section and the diameter being maintained uniform throughout the bend.

Another object of the invention is to provide attaching means for a torsion bar which permits low spring positioning and by which the riding height of the vehicle is adjustable, the arrangement further being such that the torque produced in the bar holds the bar in position on the vehicle.

Other objects of this invention will appear in the following description and appended claims, reference being had to the accompanying drawings forming a part of this specification wherein like reference characters designate corresponding parts in the several views.

FIG. 1 is a fragmentary top plan view of a portion of a motor vehicle chassis provided with a spring suspension constructed in accordance with the present invention.

FIG. 2 is a front elevation, partly in section, of the torsion bar and mounting thereof shown in FIG. 1.

FIG. 3 is a perspective view of the torsion bar shown in FIGS. 1 and 2 and illustrates the new torsion bar ends of the present invention.

FIG. 4 is an enlarged fragmentary top plan view of the torsion bar end construction shown in FIG. 1.

FIG. 5 is a front elevation of the torsion bar end construction of FIG. 4.

FIG. 6 is a sectional detail view taken substantially on a line 6—6 of FIG. 5.

FIG. 7 is a fragmentary side elevation, partly in section, of the torsion bar lever end receiving portion of the frame.

FIG. 8 is a sectional detail view taken substantially on a line 8—8 of FIG. 7.

FIG. 9 is a fragmentary front elevation, partly in section, of a modified bar end socket of the invention.

FIG. 10 is a view similar to FIG. 9 but showing a further form of bar end socket.

FIG. 11 is an end view of the bar end socket shown in FIG. 10.

FIG. 12 is a view similar to FIG. 9 but showing a still further form of bar end socket.

FIG. 13 is an end view of the arrangement shown in FIG. 12.

Before explaining in detail the present invention it is to be understood that the invention is not limited in its application to the details of construction and arrangement of parts illustrated in the accompanying drawings since the invention is capable of other embodiments and of being practiced or carried out in various ways. Also it is to be understood that the phraseology or terminology employed herein is for the purpose of description and not of limitation.

Referring to FIGS. 1 and 2 of the drawings, the invention has been illustrated as incorporated for use in connection with independently mounted and sprung vehicle wheels. A portion of the vehicle chassis has been shown as including a longitudinal sill or side frame member 12 connected by cross frame members 14 and 16 to another sill frame member (not shown). The vehicle is provided with a pair of front dirigible wheels, one of which is shown at 20 connected to the frame by means of upper and lower short and long vertically swinging suspension arms 22 and 24, respectively. As in conventional practice the outer ends of the suspension arms are pivoted at 26 and 28, respectively, to the upper and lower ends of a conventional wheel spindle mounting 30. The inner ends of the suspension arms 22 and 24 are pivoted to frame cross member 14 at 32 and 33, respectively.

The spring suspension for the vehicle in the illustrated embodiment comprises an individual longitudinal torsion bar 35 for each wheel. Such torsion bars 35 are preferably of solid construction and when installed are initially stressed or pre-set by winding or twisting them angularly a predetermined amount so as to support the spring weight of the vehicle with the desired road clearance under no load conditions. An important feature of the present invention resides in the provision of lever arms or levers integrally bent from the ends of the main body of the bars and by means of which the latter are connected to the wheels as to respond to vertical displacement thereof during operation of the vehicle. Another important feature resides in the provision of simplified attaching means between the lever arms and the frame and between the lever arms and the wheel supporting structure.

The torsion bar 35 is constructed and formed with lever arms 37 and 38 as shown in FIG. 3. Lever arms 37 and 38 are integral with the bar 35 and are formed thereon by bending the bar ends at 39 preferably so that the bends are of uniform diameter throughout. The bar is not flattened or otherwise distorted in the area of the bend which greatly increases the strength of the bar in this area resulting in reducing breakage to a very minimum.

Attaching means are provided for connecting the torsion bar 35 to the frame member 16 and to the lower suspension arm 24 of the wheel supporting structure through the lever arms 37 and 38, respectively. Such means preferably take the form of a transverse notch 40 adjacent the end of the lever arm 38 engageable with bearing means such, for example, as particularly shown in FIGS. 4, 5 and 6. A suspension arm, such as lower suspension arm 24, of inverted channel or hat-section has a pivot 33 about which the arm is swingable vertically. The axis of bar 35 is parallel to the axis of pivot 33 which positions the lever arm 38 with respect to the suspension arm 24 so that the extremity 42 may be received within the channel section. The lateral flanges 43 of the arm 24 are provided with arcuate pockets 44 to receive the ends of a fulcrum pin 46 centrally notched to receive the thickened portion 48 of the lower arm 38 adjacent the bend 39 therein. The end of the lever arm 38 is adjustably positioned with respect to the suspension arm 24 by means of a U-bolt 49 the legs 50 of which project through apertures in the top wall of the channel. The bight 51 of the U-bolt 49 engages the notch 40 in the lever arm 38, which arm may be raised or lowered from the position illustrated in FIG. 5 by means of the nuts 52 threaded on the legs 50 of the U-bolt 49.

The lever arm 37 at the other end of the torsion bar 35 is received in apertures 54 and 55 provided in front cross member 16 and retained therein solely by the torque or twist provided in the bar initially and during installation on the vehicle. The apertures 54 and 55 may be formed by punching and extending the metal to provide upstanding oval flanges 56 and 57 as shown. These flanges 56 and 57 are offset laterally so that the diametrically opposite wall portions 58 and 59 are contacted respectively by the extremity of the lever arm and by the thickened portion 48 of the arm 37 in the area of the bend 39. Such arrangement facilitates the insertion of the lever arm 37 into the apertures and provides bearing surfaces for the arm which, due to torsion bar characteristics, permits the assembly to be free of added attaching means.

FIG. 9 illustrates a modified attaching means between the lever arm 38 and the suspension arm 60. This form of the invention lends itself to use with suspension arm channel sections opposite to that shown in FIGS. 4, 5 and 6. In other words, the base 61 of the channel forms the lower surface of the arm and is pierced at 63 and formed with half pockets 64 and 65 above and below the plane of the base 61, respectively. In this case a fulcrum for the lever arm 38 is provided at 66 and a locating means 67 for engagement with notch 40 is formed by stamping a cooperating inward projection in base 61.

A further modification of attaching means between the lever arm 38 and suspension arm 70 of channel form may take the form shown in FIGS. 10 and 11 wherein it will be noted that a bracket plate 72 serves to provide a fulcrum at 73 and socket for the end of the arm 38. Bracket plate 72 bridges the open bottom of channel 70 and is secured to the flanges 74 thereof as by welding or riveting. Plate 72 is pierced at 75 and formed with half pockets 76 and 77 above and below the plane of the plate. Plate 72 is also formed with depending flanges 78 and 79, the flange 78 being of arcuate form to conform to the curvature of the lever arm 38 at the thickened portion to provide the fulcrum for the bar 35.

A still further form of attaching means is illustrated in FIGS. 12 and 13 which may be considered a combined clip and U-bolt type having the advantages of both previously described forms of attachment. In this instance the suspension arm 85 is a channel of hat-section the flanges 86 and 87 of which are bridged by a cross rib 88 welded or otherwise secured thereto. Rib 88 provides the fulcrum for torsion bar 35 the lever arm 38 of which carries clip member 90 consisting of a metal strap having a main portion 92 overlying the arm 38 and a return bent portion 93 embracing the extremity of the lever arm. The other end of portion 92 is bent downwardly to embrace the curvature of the bar 35 at the bend therein, then upwardly and back upon itself at 95 to provide an arcuate bearing 94 for engagement with the fulcrum 88. The edges of the portion 93 are suitably notched at 97 and 98 to receive the parallel legs 99 of a U-bolt the bight of which adjustably supports the extremity of lever arm 38 with respect to the suspension arm 85.

I claim:

1. In a vehicle having a frame and a pair of transversely spaced road wheels, suspension means for the wheels including a frame member, a vertically swingable suspension member pivotally connected adjacent its inner end to the frame member and connected adjacent its outer end to a wheel, a spring torsion bar having a rectilinear torsional section terminating in a substantially right angularly bent end portion having a connection adjacent the outer end thereof to a member, said connection including a notch in said end portion and a U-bolt having the bight thereof embracing said end portion and fitting into said notch and having spaced legs extending from said bight and secured to said last named member.

2. In a vehicle having a frame and a pair of transversely spaced road wheels, suspension means for the wheels including a frame member, a vertically swingable suspension member pivotally connected adjacent its inner end to the frame member and connected adjacent its outer end to a wheel, a spring torsion bar having a rectilinear torsional section terminating in a substantially right angularly bent end portion having a connection adjacent the outer end thereof to a member, said connection including a notch in said end portion extending substantially parallel to said torsional section and a U-bolt having the bight thereof embracing said end portion and fitting into said notch and having spaced legs extending from said bight, and means for adjustably securing the ends of said legs to said last named member.

3. In a vehicle having a frame and a pair of transversely spaced road wheels, a vertically swingable suspension member connected adjacent its inner end to a frame member and connected adjacent its outer end to a wheel, a pre-stressed spring torsion bar having a rectilinear torsional section terminating in a bend providing an angularly bent end member having a connection to said suspension member at a locality outwardly spaced from said bend in the torsion bar, said bend being of enlarged cross-section, and means at the locality of said bend for freely connecting said torsion bar to said suspension member.

4. In a vehicle having a frame and a pair of transversely spaced road wheels, a vertically swingable suspension member connected adjacent its inner end to a frame member and connected adjacent its outer end to a wheel, a pre-stressed spring torsion bar having a substantially rectilinear torsional section terminating in a bend providing an angularly bent end member having a connection adjacent the outer end thereof to said suspension member, said connection including a bolt having a portion embracing said end member and having an interlocking connection therewith, said bolt having leg means extending from said portion and connected to said suspension member.

5. In a vehicle having a frame and a pair of transversely spaced road wheels, a vertically swingable suspension member connected adjacent its inner end to a frame member and connected adjacent its outer end to a wheel, a pre-stressed spring torsion bar having a substantially rectilinear torsional section terminating in a bend providing an angularly bent end member having a connection adjacent the outer end thereof to said suspension member, said connection including a bolt having a portion embracing the outer end of said end member and having interconnection therewith comprising a notch in one receiving a projection on the other, said bolt having leg means extending from said interconnection, and means for adjustably mounting said leg means on said suspension member to vary the angular position of said end member.

6. In a vehicle having a frame and a pair of transversely spaced road wheels, a vertically swingable suspension member connected adjacent its inner end to a frame member and connected adjacent its outer end to a wheel, a pre-stressed spring torsion bar having a substantially rectilinear torsional section terminating in a bend providing an angularly bent end member having a connection to said suspension member at a locality outwardly spaced from said bend in the torsion bar, said bend being of enlarged cross-section, and means at the locality of said bend for freely connecting said torsion bar to said suspension member, said connection including a notch in said end member and a bolt having a portion thereof fitting into said notch and leg means extending from said portion and adjustably secured to the suspension member.

(References on following page)

References Cited in the file of this patent

UNITED STATES PATENTS

| | | |
|---|---|---|
| 1,129,418 | Nelson | Feb. 23, 1915 |
| 1,656,930 | Whitney | Jan. 24, 1928 |
| 2,457,583 | McCaslin | Dec. 28, 1948 |
| 2,631,844 | Paton | Mar. 17, 1953 |
| 2,825,576 | Allison | Mar. 4, 1958 |
| 2,915,321 | Wilfert | Dec. 1, 1959 |

FOREIGN PATENTS

| | | |
|---|---|---|
| 555,388 | Great Britain | Aug. 20, 1943 |